United States Patent [19]

Cardinal, Jr.

[11] B 3,913,307
[45] Oct. 21, 1975

[54] VACUUM CONDUIT PICK-UP DEVICE
[76] Inventor: Daniel E. Cardinal, Jr., 1352 Estate Lane, Lake Forest, Ill. 60045
[22] Filed: July 19, 1973
[21] Appl. No.: 380,900
[44] Published under the Trial Voluntary Protest Program on January 28, 1975 as document no. B 380,900.

[52] U.S. Cl.............. 56/328 R; 15/340; 56/13.1
[51] Int. Cl.² .................................... A01D 46/24
[58] Field of Search....... 56/328 R, 12.9, 13.1, 13.2, 56/31; 15/340

[56] References Cited
UNITED STATES PATENTS
3,041,748 7/1962 Wetzel .............................. 15/340 R
3,460,330 8/1969 Black, Jr. ......................... 56/328 R
3,756,001 9/1973 Macidull ......................... 56/328 R

*Primary Examiner*—Robert Peshock
*Assistant Examiner*—J. N. Eskovitz
*Attorney, Agent, or Firm*—Andrus, Sceales, Starke & Sawall

[57] ABSTRACT

A flexible pick-up conduit is connected to a source of vacuum for picking up fruit, leaves and the like. The conduit is mounted to an assembly which includes at least three longitudinally expandable accordian-like tubular control members normally extending parallel to the conduit. Pressurized air flows through the control members, and the relative air flow therethrough is selectively variable, as by a proportioning valve, thereby causing the tilt angle of the conduit and its mouth to change.

7 Claims, 5 Drawing Figures

VACUUM CONDUIT PICK-UP DEVICE

BACKGROUND AND SUMMARY OF THE INVENTION

This invention relates to a vacuum conduit pick-up device, and more particularly to a device for picking up citrus fruit, leaves, debris or other material for transfer to a container or the like, and utilizing a conduit which is directionally controlled.

The invention contemplates that the pitch or tilt angle of at least the outer end portion and mouth of the conduit may be selectively varied to facilitate pick-up of material disposed in different angular positions. This is accomplished by utilizing a flexible conduit coupled to at least three longitudinally expandable tubular control members. A continuous flow of pressurized air flows through the control members, and the air flow is individually variable as to each, thereby causing the angle of the conduit to change.

BRIEF DESCRIPTION OF THE DRAWING

The accompanying drawing illustrates the best mode presently contemplated by the inventor for carrying out the invention.

In the drawing.

DESCRIPTION OF THE PREFERRED EMBODIMENT

Figure 1:
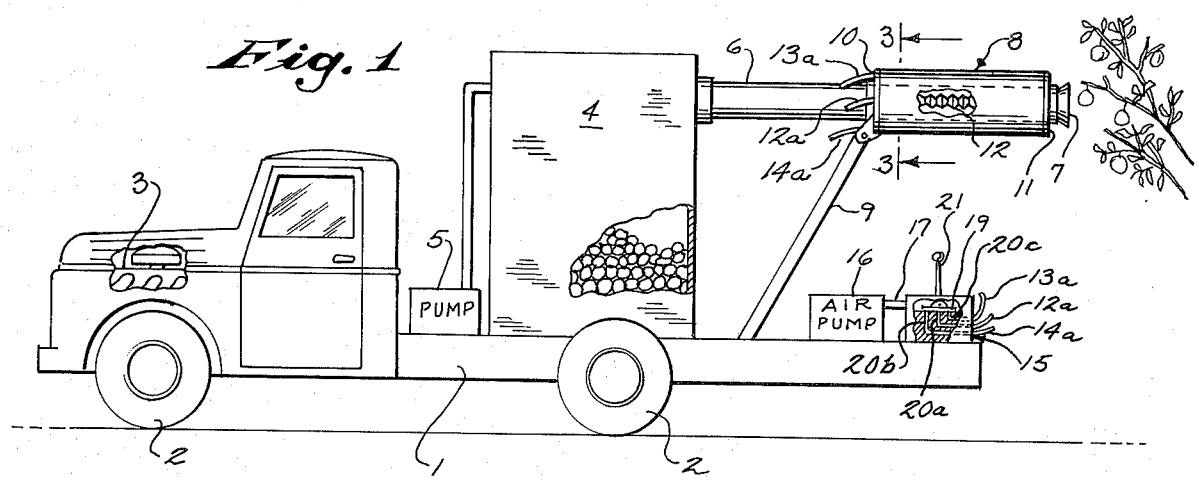
FIG. 1 is a schematic view of a vacuum conduit pick-up device constructed in accordance with the invention.
Figure 2:
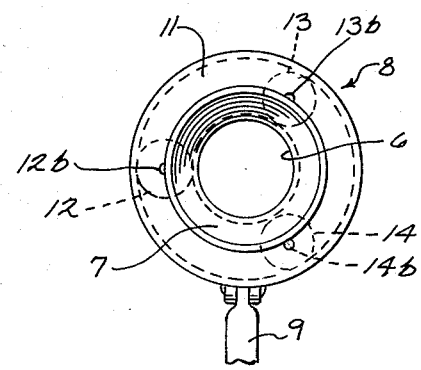
FIG. 2 is an end view of the pick-up assembly.
Figure 3:
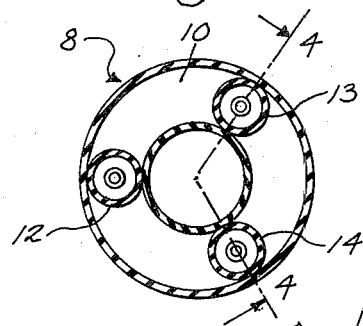
FIG. 3 is an enlarged transverse section of the pick-up assembly taken on line 3—3 of FIG. 1.

As shown in FIG. 1 of the drawings, the device of the invention may be embodied in a fruit harvester having a chassis or frame 1, ground engaging wheels 2 and an engine or other power source 3. A collection box 4 for fruit is mounted to frame 1 and is connected to a vacuum pump 5. A fruit pick-up and transfer conduit 6 is mounted with its inner end opening into box 4, and with its outer end wide mouth 7 formed to engage and remove fruit from trees or the like. Operation of pump 5 will cause an inward flow of air so that fruit will be sucked inwardly through conduit 6 into box 4.

Conduit 6 is flexible and may be of substantial length, and at least the outer end portion thereof forms part of a directional control assembly 8, as will be described in detail hereinafter. The weight of the conduit and assembly may be substantial, and is supported by means such as a boom 9 mounted to the harvester frame. As shown, boom 9 fixedly secures the inner end portion of assembly 8.

Assembly 8 comprises a pair of longitudinally spaced flanged annular inner and outer rings 10, 11 of metal or other relatively rigid material. Inner ring 10 is secured to boom 9, while ring 11 is movable. Conduit 6 passes through both rings and terminates in mouth 7 a short distance outwardly from outer ring 11.

In accordance with the invention, selectively controllable longitudinally expandable means are disposed along and parallel to the conduit walls to support the conduit wall in a relatively rigid position and to change the angle of disposition of the conduit. For this purpose, and in the embodiment shown, three flexible tubular accordian-like control members or bellows 12, 13, 14 extend between rings 10 and 11 and with their ends secured thereto in any suitable way. The inner ends of members 12, 13 and 14 are connected through suitable ports in inner ring 10 and air lines 12a, 13a and 14a to an air proportioning valve 15. The outer ends of members 12, 13 and 14 are connected through restrictive air discharge or bleeder ports 12b, 13b and 14b in outer ring 11.

The invention contemplates that pressurized air continuously flows outwardly through members 12, 13 and 14, thus pressurizing and expanding them longitudinally from their normal generally retracted position, and thereby supporting conduit 6. For this purpose an air pump 16 is mounted on frame 1 and connected to valve 15 through an air line 17, and hence to the control members.

Figure 4:
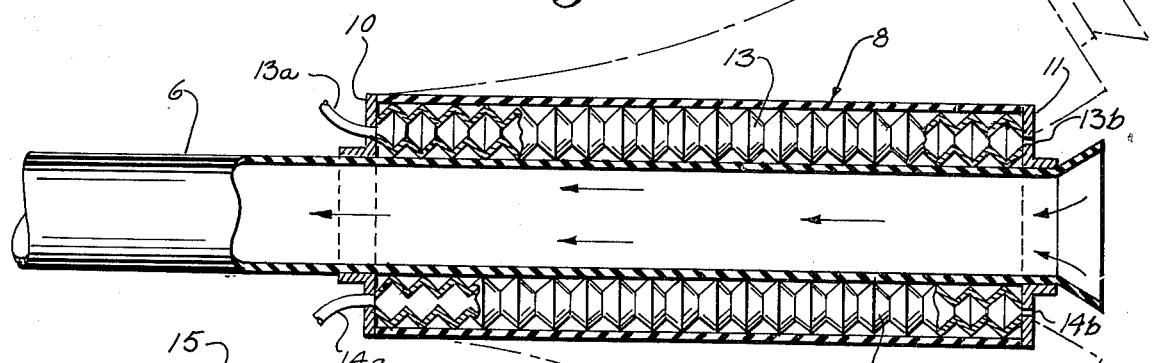
FIG. 4 is a longitudinal section taken on line 4—4 of FIG. 3 and showing the conduit in different angular positions.
Figure 5:
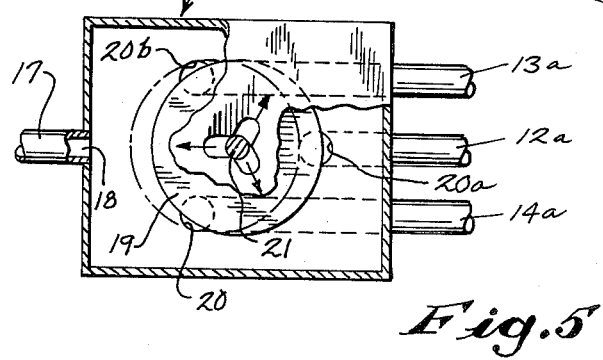
FIG. 5 is a schematic showing of the air proportioning valve for the control members.

The invention also contemplates varying the relative air pressures within the control members so they expand longitudinally outwardly by different amounts. This will cause conduit 6 to tilt, as shown in FIG. 4, thereby making it possible for mouth 7 to effectively engage fruit or other material which is disposed at different angles. For this purpose, valve 15 may be of any suitable proportioning type wherein the air inlet port 18 from line 17 is connected through a slideable valve plate 19 to ports 20a, 20b and 20c which connect to respective air lines 12a, 13a and 14a. A manual handle 21 controls the slideable portion of plate 19 to vary the relative amount of air flow through members 12, 13 and 14. Handle 21 may be replaced with any other suitable manual or automatic device.

In order to provide complete 360° rotational control of conduit 6, at least three control members will be required.

Bleeder ports 12b, 13b and 14b serve to assist in pressure build-up within the control members. If desired, needle valves (not shown) may be disposed in the bleeder ports to provide a balanced initial setting for the system.

While valve 15 is shown as mounted on frame 1, it could be positioned adjacent assembly 8 or any other desired place without departing from the spirit of the invention.

Various modes of carrying out the invention are contemplated as being within the scope of the following claims particularly pointing out and distinctly claiming the subject matter which is regarded as the invention.

I claim:

1. A device for picking up fruit or other materials comprising, in combination:
   a. a frame,
   b. an elongated flexible conduit mounted on said frame and with said flexible conduit having an outer end mouth for engaging the said materials,
   c. means for vacuumizing said conduit so that the said materials will flow through said conduit from said mouth,
   d. a plurality of tubular flexible longitudinally expandable members disposed along and generally parallel to the outer end portion of said flexible conduit,
   e. and means to expand said flexible expandable members to thereby support the wall of said flexible conduit and hold it in a relatively rigid position at a desired angle of disposition.

2. The device of claim 1 which includes: means to selectively vary the amount of relative expansion of said plurality of flexible members to cause said conduit to change its angle of disposition.

3. The device of claim 2:
   a. which includes longitudinally spaced support means for the ends of said flexible expandable members,
   b. which includes air inlet means for said expandable members, as well as air bleeder means for the discharge ends of said expandable members,
   c. and in which said means to expand said expandable members includes a source of air connected to said air inlet means for continuously pressurizing the interior of said members.

4. The device of claim 3 in which said expansion varying means comprises a proportioning valve disposed between said source of air and said inlet means.

5. The device of claim 4 in which said longitudinally spaced support means comprises a pair of annular rings through which said flexible conduit passes, one of said rings being movable relative to the other ring.

6. The device of claim 5 in which said expandable members comprise bellows.

7. A device for picking up fruit or other materials comprising, in combination:
   a. a frame,
   b. an elongated flexible conduit mounted on said frame and with said conduit having an outer end mouth for engaging said materials,
   c. means for vacuumizing said conduit so that the said materials will flow through said conduit from said mouth,
   d. a plurality of bellows disposed along and generally parallel to the outer end portion of said conduit,
   e. and means to expand said bellows to thereby support the wall of said conduit and hold it in relatively rigid position at a desired angle of disposition.

* * * * *